SUPERCONDUCTOR

Original Filed March 17, 1966

Inventors:
John A. Roberts,
Peter R. Roberts,
By Hofgren, Wegner, Allen, Stellman & McCord Attys.

United States Patent Office 3,625,662

Patented Dec. 7, 1971

3,625,662

SUPERCONDUCTOR

John A. Roberts, North Chelmsford, and Peter R. Roberts, Groton, Mass., assignors to Brunswick Corporation Continuation of application Ser. No. 535,222, Mar. 17, 1966. This application May 18, 1970, Ser. No. 38,457
Int. Cl. B21c *37/00;* H01b *5/08;* H01f *7/22*
U.S. Cl. 29—191.6 13 Claims

ABSTRACT OF THE DISCLOSURE

A superconductor formed by the physical or geometrical relationship of two or more materials comprising a composite structure; the superconductive means being located substantially within a matrix. The superconductive means includes elemental materials, solid solution metal alloys, and/or diffusion gradient metals. The matrix comprises at least one non-superconductive metal component.

CROSS REFERENCE TO CO-PENDING APPLICATION

This application is a continuation application of our co-pending application Ser. No. 535,222 filed Mar. 17, 1966, and now abandoned.

This invention relates to superconductors.

Certain metals have been found to undergo a unique transformation at extremely low temperatures, such as below approximately 18° Kelvin, whereby the metals may carry electrical currents substantially without resistance thereto. In superconductors of extremely small cross-section, all or part of the current flows along the surface portion of the conductor, the surface portion comprising in extremely small cross-section conductors a major portion of the total cross-section of the superconductor. Heretofore, the provision of relatively small thickness electrical conductive elements has been limited to intermetallic compound structures such as the niobium stannide superconductor structure of the Allen et al. U.S. Pat. No. 3,218,693. The present invention comprehends an improved superconductor structure having extremely small cross-sectional dimensions permitting a utilization of a major portion of the entire composite structure as the superconductor current carrying portion thereof and permitting the use of a wide range of superconductive materials heretofore not considered practical for such small section superconductor structures.

Thus, a principal feature of the present invention is to provide an improved superconductor structure.

Another feature of the invention is the provision of a composite superconductor structure wherein the elements are extremely small and wherein the superconductive surface portion of the elements represents a major portion of the thickness of the elements.

A further feature of the invention is the provision of a superconductor structure wherein the thickness of the superconductive elements is under approximately 12 microns.

A further feature of the invention is the provision of such a superconductor structure wherein a plurality of superconductive elements having different superconductive characteristics are provided in the structure.

Still another feature of the invention is the provision of such a superconductor structure wherein the superconductive means comprises a continuously variable diffusion zone at an interface between two metallic portions of the composite.

Another feature of the invention is the provision of such a superconductor structure defined by a plurality of facially juxtaposed sheets spirally disposed.

Still another feature of the invention is the provision of such a superconductor structure comprising a cylindrical composite made up of a plurality of juxtaposed sheets disposed in parallel planes.

A further feature of the invention is the provision of such a superconductor structure wherein the superconductive element comprises a non-malleable alloy of malleable constituent metals.

A yet further feature of the invention is the provision of such a superconductor structure wherein the composite is arranged in a novel manner to substantially preclude eddy current losses.

Another feature of the invention is the provision of such a superconductor structure wherein the superconductive material is arranged to have substantial current bypassing association with the matrix body to shunt electrical current from the superconductive material in the event the superconductive material becomes normal (i.e., nonsuperconductive) thereby effectively precluding destruction of, or undesirable modification of, the superconductor.

Other features and advantages of the invention will be apparent from the following description taken in connection with the accompanying drawing wherein.

Figures 1, 2, 2A, 3, 4, 5, 5A, 6:
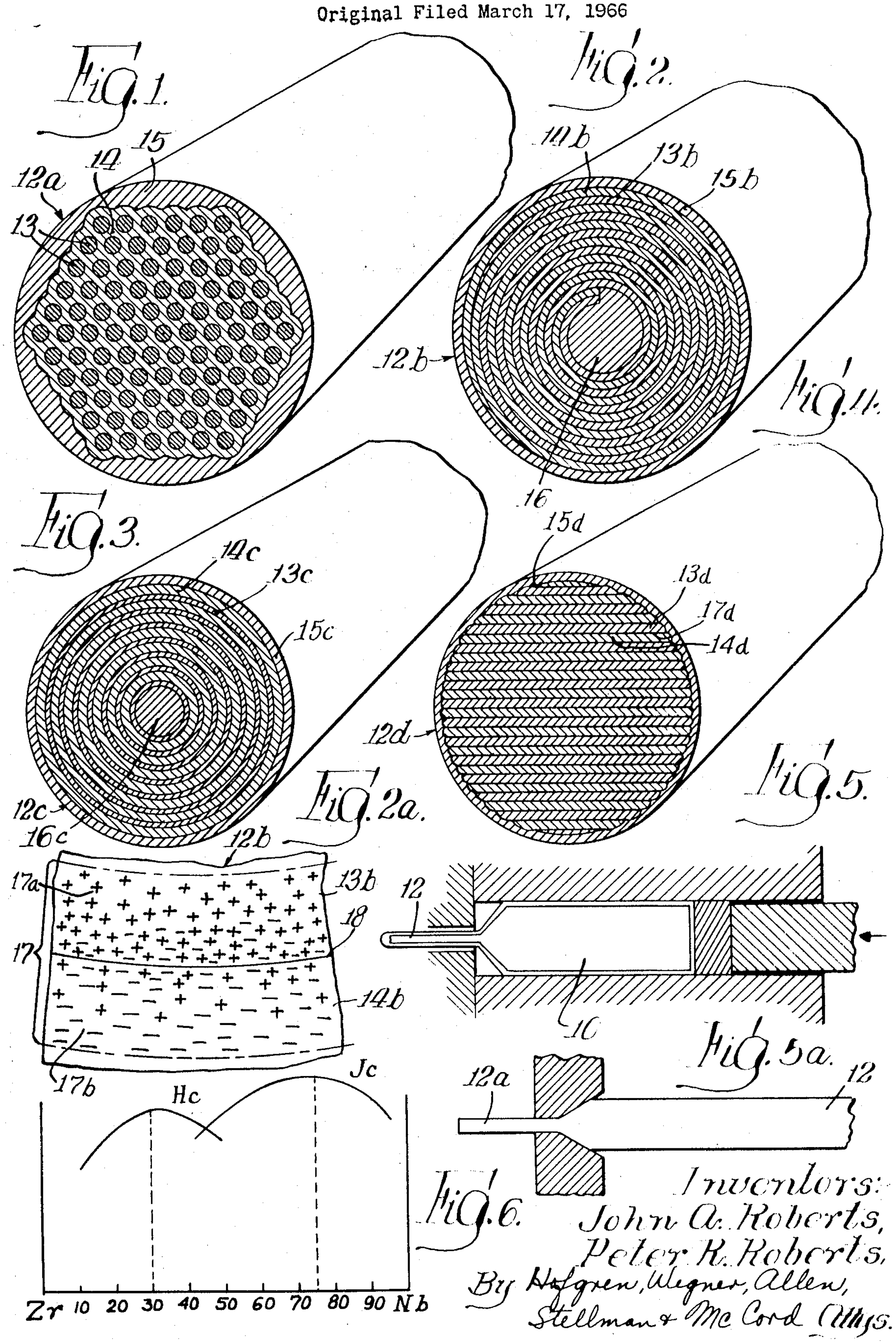
FIG. 1 is a transverse sectional, isometric view of a composite superconductor embodying the invention.
FIG. 2 is a transverse sectional, isometric view of a modified form of a composite superconductor embodying the invention.

FIG. 2*a* is a fragmentary schematic micrograph section of the superconductor;

FIG. 3 is a transverse sectional, isometric view of another modified form of a composite superconductor embodying the invention;

FIG. 4 is a transverse sectional, isometric view of still another modified form of a composite superconductor embodying the invention;

FIG. 5 is a schematic diametric section of a billet being extruded to form a composite;

FIG. 5*a* is a schematic diametric section of the composite being wire drawn to form the superconductor; and FIG. 6 is a graph illustrating the characteristics of some of the composite superconductors embodying the invention.

The present invention comprehends an improved super-conductor structure comprising a composite formed of a plurality of elements each of which has a very small thickness. The elements may be suitably selected to provide a diffusion zone therebetween producing a superconductor portion of correspondingly extremely small thickness. The superconductor zone may comprise a continuously variable zone as where the diffusion is a maximum at the interface between the elements and varies continuously to a minimum intermediate the elements. The invention comprehends forming the composite superconductor by suitably constricting a composite billet 10 as shown in FIG. 5 by suitable means such as conventional extruding means so as to provide a reduced diameter composite superconductor 12. The billet may be constricted in any suitable manner such as by the illustrated extruding step, hot or cold rolling, hot or cold drawing, and the like as will be obvious to those skilled in the art. The constriction may be effected in a plurality of steps which may include different ones of the different constricting methods or may be similar steps as desired. In illustrating the invention, for the sake of simplicity only, the description will be limited to the method of forming the composite superconductor by an extruding step, such as illustrated in FIG. 5, and followed by a wire drawing step as illustrated in FIG. 5*a*.

Referring now to FIG. 1, a composite superconductor embodying the invention, generally designated **12*a*, is shown to comprise a plurality of filaments 13 extended in substantially parallel relationship in a matrix body 14 enclosed in an outer can 15**.

In the illustrative embodiment, the superconductor 12*a* is provided with the filaments 13 disposed in hexagonal close packed array with each of the filaments extending substantially parallel to the axis of the superconductor and spaced apart from each other by intermediate matrix material. Illustratively, the filaments may be formed of niobium and the matrix formed of Monel 400 alloy. The filaments are preferably extremely small in diameter, herein under approximately 12 microns, so as to provide an extremely high surface-to-volume ratio. The composite 12*a* may be formed from the original billet 10 by successive constricting steps on the single composite structure or may be formed as by cutting and rebundling a partially constricted billet to form a second billet comprised of a plurality of constricted first billets in parallel side-by-side relationship permitting a repetition of the constricting process to further constrict the filaments therein. Illustratively, in one such rebundled forming of the composite 12*a*, the composite comprised a superconductor having 6,859 filaments of approximately 0.625 micron diameter, with the outside diameter of the composite being approximately 5 mils. The original billet 10 was formed of 40-mil diameter niobium wire sheathed in Monel tubing.

The filaments may be formed of other suitable elemental hard superconductor materials such as tantalum. The matrix material may comprise a material that is ferromagnetic at the low temperatures (e.g. 4.2° K.) such as Monel metal, iron, etc., or which may not be ferromagnetic at these temperatures, such as copper, etc. Further, the matrix material may comprise a nonmetallic, electrical insulation material such as glass or metal oxides.

The Monel sheath may be intimately mated with the niobium (or other superconductive material wire) in the initial step of forming as by drawing the sheath down onto the wire. The several constricting steps may be interspersed with annealing steps to facilitate constriction. The can 15 may be formed of the same material as the sheath or matrix material 14 or may differ therefrom as desired. Further, the invention comprehends that the filaments may be formed of similar materials or of different materials as desired. The filaments may be formed of alloys as well as elemental superconductor alloy material, and alloys of different percentages or compositions may be selectively dispersed in the arrangement to provide a selected resultant composite. Illustratively, an alloy of niobium and zirconium of approximately Nb-25 atom percent Zr has been found to be an excellent superconductive material. Other alloys such as Nb-67 atom percent Zr, and Nb-50 atom percent Zr have similarly been found to provide highly desirable superconductive characteristics. Thus, a combination of such different compositions and elemental superconductive materials may be provided as desired in the composite superconductor.

At least one highly desirable feature results from the use of such different composition alloys as illustrated in FIG. 6. More specifically, as illustrated therein, with an alloy Nb-67 atom percent Zr an optimum critical field characteristic is obtained, and with a composition of approximately Nb-25 atom percent Zr a maximum current carrying capacity characteristic is obtained. Thus, by providing filaments of each of these two different materials in the same composite, each of these highly desirable characteristics may be obtained in the one superconductor.

The superconductive layer may be a malleable alloy, such as Zr-Nb, formed by interdiffusion and subsequent cold working to provide improved superconducting current carrying capacity. Such a malleable superconductor permits facilitated winding thereof in forming coils and the like. Further, the improved cold workability permits the interdiffusion to be carried out at an early stage in the forming process where the rods are still relatively large size thereby providing improved control of the diffusion process.

The invention further comprehends that the matrix material separating the individual filaments may be electrically and thermally conductive so as to provide means for shunting electrical current and withdrawing heat from localized portions of the superconductor which may for some reason become normal during superconductive operation of the structure. Illustratively, in the use of such superconductive materials as superconductors at low temperatures, nucleated zones of normal state have been found to occur. If these nucleated zones are allowed to grow the entire superconductor goes normal, that is, loses its superconductive characteristics and acts as a normal electrical conductor having a sensible resistance to electrical currents. The extremely high currents flowing through such a normal conductor would tend to destroy or modify the characteristics of the superconductor by the excessive heat produced. Thus, it is highly desirable to preclude such occurrences. The intimate association of the matrix material with the superconductive filament material and the fact that the filament material in the superconductor 12*a* is of extremely small thickness permits the conductive matrix material to suppress growth of such nucleated zones by relieving localized high current or high temperatures condition.

The invention comprehends providing matrix and filamentary materials having similar flow stress characteristic to insure a substantially uniform reduction of each thereof during the constriction steps. Thus, improved uniform cross-section of the structure is obtained.

As indicated briefly above, the invention comprehends broadly the concept of providing the superconductive material in a composite in extremely small-thickness form so as to effectively maximize surface-to-volume ratio and thereby substantially improve the superconductive current carrying characteristics of the structure. This surface-to-volume maximization by the filamentary structures may also be effectively obtained by means of improved thin sheet configurations, as illustrated in FIGS. 2 through 4. Referring to FIG. 2, a spirally wound sheet form of superconductor 12*b* is shown to comprise a first sheet 13*b* facially juxtaposed to a second sheet 14*b*, with the sheets wrapped around a central former 16 in a spiral arrangement. The spiral arrangement may be enclosed in a suitable can 15*b* so as to provide a superconductor which may be formed as by constriction of the original billet, generally in the same manner as may be superconductor 12*a*. As will be obvious to those skilled in the art, by suitably transversely reducing the spiral configuration, the thickness of the individual sheets decreases so that the resultant final superconductor may have individual sheet thicknesses of under approximately 12 microns. The former 16 may be formed of superconductive material or otherwise as desired.

The superconductive means in superconductor 12*b* may comprise, as shown in FIG. 2*a*, a diffusion zone 17 extending in both directions from the interface 18 between the respective sheets 13*b* and 14*b*. More specifically, sheet 13*b* may comprise a zirconium sheet and sheet 14*b* may comprise a niobium sheet; thus, by suitably effecting an interdiffusion of the two sheets at the interface 18 (i.e. atoms of zirconium schematically indicated as + diffused into the niobium sheet 14*b* and atoms of niobium schematically indicated as — diffused into the zirconium sheet 13*b*), a zone 17 is obtained wherein the composition of the sheets at the interface 18 is approximately 50 percent of each material and varies continuously in both directions therefrom to a maximum percent of zirconium, as at 17*a* of the zone 17 in the zirconium sheet, and to a maximum percent of niobium, as at 17*b* of the zone 17 of the niobium sheet 14*b*. Thus, the zone 17 automatically provides a continuous range of zirconium-niobium compositions between the extremes of maximum percent zirconium to maximum percent niobium, which maximum percent may be up to 100 percent. Thus, the desirable optimum current carrying capacities and field strength characteristics discussed above relative to the filamentary composition 12*a* having filaments formed of different superconductive compositions may be similarly provided in the superconductor 12*b*. In superconductor 12*b*, the two sheets effectively comprise the two different portions of the matrix body with the diffusion zone formed in the facially juxtaposed portions of the sheets comprising the superconductive means similar to the filaments of superconductor 12*a*. The thickness of the superconductive zone 17 obviously may be suitably controlled by the diffusion process which may illustratively comprise a suitable heating step (such as at 1800° F. where the sheets are formed of niobium and zirconium as discussed above).

Another highly desirable feature of the superconductor 12*b* is the effective suppression of gross transverse eddy currents in the superconducting material as a result of the extremely small thickness of the diffusion zones and because of the elimination of any closed annular paths by the spiral configuration of the sheets. Thus, eddy current losses which in conventional superconductor constrictions having large transverse cross-sections present a serious loss problem are effectively eliminated in the superconductor of the present invention.

In FIG. 3 still another form of composite superconductor 12*c* is shown to comprise a superconductor generally similar to superconductor 12*b*, except that the respective sheets 13*c* and 14*c* are in the form of tubes concentrically related about an axial former 16*c* in lieu of the spiral relationship of the sheets of superconductor 12*b*. The outer can 15*c* is similar to the outer can 15*b* of the superconductor 12*b*. Thus, tubes 14*c* may be formed of niobium, tubes 13*c* may be formed of zirconium, and can 15*c* may be formed of copper. In each of superconductors 12*b* and 12*c*, it is preferable that the copper can contact only the niobium sheet material. As in superconductor 12*b*, the superconductive means in superconductor 12*c* may comprise a diffusion zone 17 between the sheets, which in the illustrated embodiment have a thickness of under approximately 12 microns. In superconductor 12*c*, however, a plurality of such zones will be formed having spaced annular configurations whereas in superconductor 12*b* a single continuous diffusion zone is provided in a spiraling configuration.

Referring now to FIG. 4, still another form of superconductor 12*d* is shown to comprise a superconductor generally similar to superconductor 12*b*, except that the sheets 13*d* and 14*d* are planar, extending diametrically and chordally relative to the axis of the superconductor within the external can 15*d*. Here again, in the illustrated embodiment the superconductive means comprises a diffusion zone 17*d* between the sheets 13*d* and 14*d* in the laminated configuration, the sheets having a thickness of under approximately 12 microns.

As will be obvious to those skilled in the art, the composite superconductor may be made up of a plurality of rebundled, previously constricted billet structures of the type generally disclosed in FIGS. 1 through 4, as well as other suitable constricted billet configurations. Thus, for example, the filaments of FIG. 1 may actually comprise previously constricted billets of the spiral configuration illustrated in FIG. 2. Still further, different structures may be employed in the same composite superconductor as the superconductive means therein; illustratively, both homogeneous filaments of the type illustrated in FIG. 1 and spirally wound elements may be combined in the same composite superconductor in parallel spaced relationship.

A further alternative in the construction of the superconductors comprehended by the present invention is in the utilization of solid solution materials, such as listed below, as the superconductive materials in lieu of the superconductive materials discussed above.

EXAMPLES OF SOLID SOLUTION TYPE HARD (I.E., CLASS II) SUPERCONDUCTOR COMPOSITES

Zr-Nb
Ti-Nb
Ti-V
Mo-Re
Ti-Zr-V
Ti-Zr-Nb
Ti-Nb-V
Zr-Nb-V

Still further, the superconductive material may comprise intermetallic compounds. It is possible by utilizing the diffusion method of forming the superconductive material as discussed above to utilize relatively malleable sheet materials permitting facilitated constriction, while yet the final superconductive material may comprise a relatively non-malleable diffusion product. Illustratively, where one sheet is formed of niobium, the other sheet may be formed of a suitable tin bearing alloy whereby each of the sheets is relatively malleable, while the resultant $Nb_3Sn$ diffusion product is relatively non-malleable. Other examples of such malleable sheets are vanadium sheets with a silicon bearing alloy to produce the intermetallic $V_3Si$. Another example of such malleable sheets are vanadium sheets with a gallium bearing alloy to produce the intermetallic $V_3GA$. Still another example of such malleable sheets are niobium sheets with a carbon bearing alloy to produce the intermetallic NbC.

Other materials which may be used to provide a diffusion zone superconductive means are illustrated in the following tables:

| Material A | Material B | Resultant solid solution or other alloy diffusion zone composition |
|---|---|---|
| Ti | Nb | Ti-Nb |
| Ti | V | Ti-V |
| Zr-Ti | Nb | Zr-Ti-Nb |
| Zr-Ti | V | Zr-Ti-V |
| Zr-Nb | Ti | Zr-Nb-Ti |
| Zr-V | Ti | Zr-V-Ti |
| Ti-Nb | Zr | Ti-Nb-Zr |
| Ti-V | Zr | Ti-V-Zr |

Another variation of the superconductor structure within the scope of the invention comprises the utilization of more than two different sheets of materials in the sheet type superconductors such as illustrated in FIGS. 2 through 4. The different sheets may be arranged in successive order such as A-B-C-A-B-C or in other suitable orders such as A-B-C-B-A-B-C.

An example of a method of forming an intermetallic superconductor of the $Nb_3Sn$ type comprehended by the present invention is as follows:

A plurality of Nb rods are individually sheathed in tubes of tin bearing alloy. The assembly is then extruded at a suitable temperature such as 1000° F. The billet is then wire drawn in a series of steps with intermediate heat treatment at temperatures not exceeding 1000° F. The resultant reduced composite is then heat treated such as at 1800° F. for a sufficient period of time to form a coherent continuous diffusion zone of $Nb_3Sn$ around each filament having a thickness of approximately 1000° A.

Such a resultant composite superconductor provides the highly desirable superconductor current carrying characteristics while yet remaining relatively flexible, permitting the superconductor to be readily formed into coils and the like which may be unwound if desired without resultant cracking of the intermetallic material.

As discussed above, the superconductive means may be a Class II superconductive means. It may be defined by the interdiffusion zone between different matrix materials. Alternatively, the superconductive means may be defined by the filaments themselves where the filaments are formed of a suitable superconductive material. Illustratively, the filaments may be formed of Nb, Zr-Nb alloy, etc. They may be formed as described above by suitable constriction within the matrix body where the matrix body may be a suitable material such as Monel metal. Upon suitable reduction in cross-sectional area, the filamentary superconductors exhibit the desirable characteristics discussed above of the extremely thin superconductive means as the filaments themselves may have the desired extremely small thickness. Similarly, the superconductive elements may be comprised solely of the superconductive material in the spiral form of superconductor as shown in FIG. 2 and in the concentric tube form as shown in FIG. 3, as by forming the sheets respectively of superconductive material and nonsuperconductive material, such as Nb or Zr-Nb and Monel metal sheets, respectively.

As indicated above, by utilizing extremely small size superconductive elements, such as the fine superconductive filaments discussed in the preceding paragraph, improved current carrying capacity is obtained. Illustratively, where the filaments are formed of Nb in a Monel matrix, the following current carrying capacity relationships to filament size have been measured.

| Filament diameter (microns) | Applied field (Kgauss) | Current density (amps/cm.$^2$) |
|---|---|---|
| 295 | 4.0 | $2.85\times10^4$ |
| | 6.0 | $8.9\times10^3$ |
| | 9.0 | $6.0\times10^2$ |
| 54.7 | 4.0 | $8.5\times10^4$ |
| | 6.0 | $4.25\times10^4$ |
| | 9.0 | $2.15\times10^3$ |
| 2.01 | 4.0 | $1.8\times10^5$ |
| | 6.0 | $1.18\times10^5$ |
| | 9.0 | $1.6\times10^4$ |
| 0.625 | 4.0 | $5.7\times10^5$ |
| | 6.0 | $3.7\times10^5$ |
| | 9.0 | $5.7\times10^4$ |

While we have shown and described certain embodiments of our invention, it is to be understood that it is capable of many modifications. Changes, therefore, in the construction and arrangement may be made without departing from the spirit and scope of the invention as defined in the appended claims.

We claim:

1. A composite material structure consisting essentially of:

(1) non-superconductive metal matrix comprising at least one component; and (2) superconductive means within said matrix, characterized in that a longitudinal cross section of said composite defines portions of said superconductive means as being laminarly spaced apart by said matrix in a substantially parallel arrangement, said superconductive means being selected from one or more of the following groups consisting of:

(a) elemental metals having a thickness greater than about 0.625 micron, (b) solid solution metal alloys having a thickness greater than about 0.625 micron, and (c) solid state diffusion zone gradient metal alloys wherein said matrix comprises at least first and second metal components and said gradient has a composition varying from a maximum of said first component to a maximum of said second component and wherein said maximum may be as great as 100%.

2. The structure of claim 1 wherein said superconductive means comprises elemental metals and solid solution metal alloys which are Class II superconductive materials.

3. The structure of claim 1 wherein said superconductive means is defined by a plurality of filaments spaced apart by said matrix wherein said filaments are selected from the group consisting of elemental metals and solid solution metal alloys.

4. The structure of claim 3 wherein said matrix is copper.

5. The structure of claim 3 wherein said matrix is a copper alloy.

6. The structure of claim 3 wherein said filaments are a niobium-titanium alloy.

7. The structure of claim 1 wherein said superconductive means are composed of at least two preselected different material compositions to provide preselected superconductive characteristics.

8. The structure of claim 1 wherein the cross sectional configuration of said structure is defined by alternate layers.

9. The structure of claim 1 wherein the cross sectional configuration of said structure is defined by alternate concentric circles.

10. The structure of claim 1 wherein said matrix comprises an electrically and thermally conductive shunt for conducting electrical current and heat at high efficiency from said superconductive means thereby to effectively inhibit nucleation and growth of nucleated zones of normal state which may occur in said superconductive means.

11. The structure of claim 8 wherein said layers comprise spirally wound juxtaposed sheets.

12. The structure of claim 11 wherein transverse eddy currents are suppressed.

13. The structure of claim 1 wherein the structure is defined by a plurality of metal filaments spaced apart by a surrounding different metal structural encasement, said solid state diffusion zone gradient metal alloy superconductive means being present at the interface between said filaments and said structural component and comprising portions thereof, and wherein the non-superconducting non-diffused portions of said filaments and said structural component comprise the matrix.

References Cited

UNITED STATES PATENTS

| | | | |
|---|---|---|---|
| 3,366,728 | 1/1968 | Garwin et al. | 335—216 X |
| 3,333,331 | 8/1967 | Swartz | 335—216 X |
| 3,301,643 | 1/1967 | Cannon et al. | 29—599 UX |
| 3,296,684 | 1/1967 | Allen et al. | 29—599 |
| 3,293,008 | 12/1966 | Allen et al. | 335—216 UX |
| 3,283,277 | 11/1966 | Hulm et al. | 335—216 |
| 3,262,187 | 7/1966 | Allen et al. | 29—599 |
| 3,218,693 | 11/1965 | Allen et al. | 29—599 UX |
| 3,187,235 | 6/1965 | Berlincourt et al. | 335—216 |
| 3,167,692 | 1/1965 | Matthias | 335—216 |
| 3,109,963 | 11/1963 | Geballe | 335—216 X |
| 3,029,496 | 4/1962 | Levi | 29—599 UX |

FOREIGN PATENTS

| | | | |
|---|---|---|---|
| 1,025,715 | 4/1966 | Great Britain | 29—599 |
| 995,710 | 6/1965 | Great Britain | 335—216 |

OTHER REFERENCES

Cline et al., Journal of Applied Physics, vol. 37, #1, pp. 5–8, January 1966.

H. J. Levinstein et al., Transactions of the Metallurgical Society of the AIME, vol. 230, pp. 1314–1318, October, 1964.

H. A. Reich, IBM Technical Disclosure, vol. 5, #7, December 1962.

Riemersma et al., Journal of Applied Physics, vol. 33, #12, December 1962.

BERNARD A. GILHEANY, Primary Examiner

D. M. MORGAN, Assistant Examiner

U.S. Cl. X.R.

29—194, 199, 599; 174—Dig. 6, 128; 335—216